Dec. 10, 1935.                J. O. BARKER                 2,024,124
              PLASTIC COMPOSITION AND DOLL'S HEAD CARRYING SAME
                           Filed Nov. 25, 1932
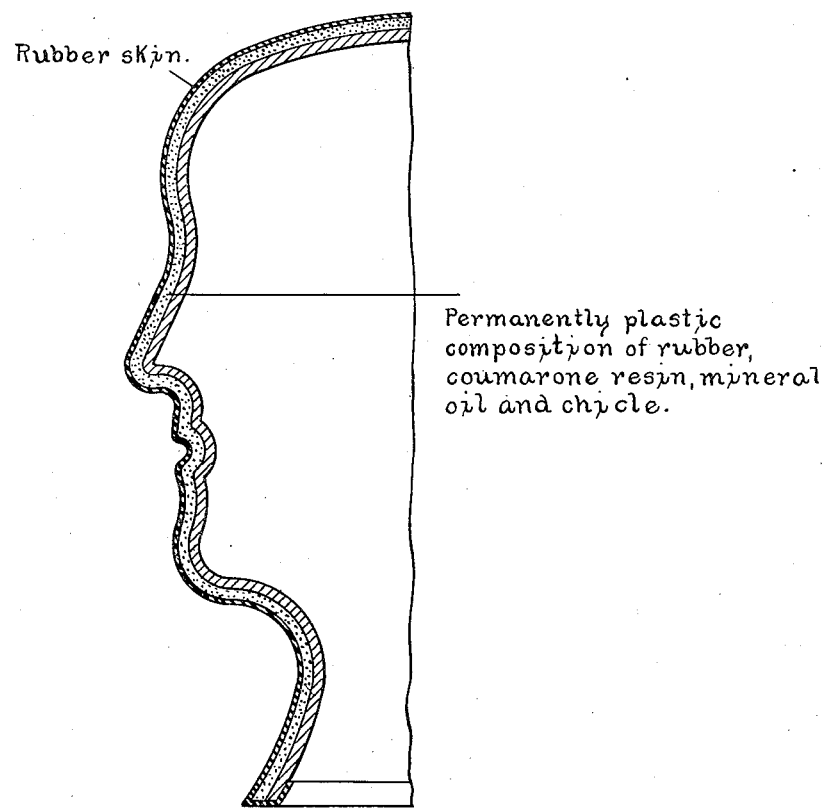
Inventor
John O. Barker
By Foster & Codier   Attorney Patented Dec. 10, 1935

2,024,124

UNITED STATES PATENT OFFICE 2,024,124

PLASTIC COMPOSITION AND DOLL'S HEAD CARRYING SAME

John O. Barker, New York, N. Y., assignor to Sweets Laboratories, Inc., New York, N. Y., a corporation of New York Application November 25, 1932, Serial No. 644,402

6 Claims. (Cl. 46—156)

The present invention relates to a plastic composition which will be suitable for modeling, for example for modeling dolls with features that can be altered at will, which composition will remain permanently plastic, will not be very greatly affected by ordinary atmospheric changes, within the temperature range commonly found in living rooms of houses, which will be non-injurious to rubber, non-injurious to the health of the users, and which while being capable of being molded will not suffer changes of shape under ordinary service conditions such as handling and the like.

Dolls are known in which the outer face of the doll is a thin rubber sheet, upon which paint or the like is applied to give the desired colors. Beneath this thin rubber sheet is a plastic composition, which can be altered in shape, for the purpose of giving a different expression to the face of the doll, for instance a smiling doll could be changed over into a doll having the appearance of sadness or crying, if desired.

The present invention relates particularly to the plastic or modeling composition, forming the inner portion of the face. The plastic can also be used, as will be obvious, for other purposes, such as for molding various articles of a useful or fancy nature.

As the base of the present invention, there is preferably used a mixture of rubber and a high melting point resin which is chemically stable and stable as regards the atmosphere. Coumarone resin is very suitable.

As a softener I preferably use a mineral oil, for example high viscosity white mineral oil such as is used for medicinal purposes. With the above ingredients I also preferably employ a small amount of chicle or other resinous rubber that does not oxidize, Peruvian chicle being suitable. Pontianak, jelutong, etc., would oxidize and would be unsuitable.

The rubber can be softened considerably, by milling on a roller mill, with the rolls closed. The rubber is well milled, for example it may be milled for twenty minutes with the rolls closed, then taken out and allowed to rest, and the milling repeated twice, allowing rest periods of one to two hours between the successive millings. This gives rubber which is rather largely broken down.

The following is a suitable formula for the purpose, although it is to be understood that I do not restrict myself to these exact proportions, and furthermore instead of coumarone resin, other resins of a similar character can be employed.

The amount of mineral oil can vary substantially, thus varying amounts from 10 to 40% of the entire mixture can be used. The amount of Peruvian chicle or ather chicle (preferably well purified) can vary between about 8 parts and about 30 or 35 or even 40 parts. The entire composition is rather tacky, somewhat resembling a chew of gum, during the chewing operation or it may be even somewhat more tacky than this.

I have above referred to the chemical stability of the coumarone resin and mineral oil. Ordinary rosin, or ordinary fatty oil would not be suitable, for the reason that the mixture would soon get undesirably hard, and furthermore the composition would soon ruin the rubber skin constituting the surface of the doll's face. At temperatures betwen about 70 and about 100° F., there is no noticeable difference in the hardness of the mass, and furthermore the mass will keep for a long time without getting hard, brittle or crumbly.

Preferred formula:—

| | Parts |
|---|---|
| Rubber | 35 |
| Coumarone resin 115 M. P. | 35 |
| Mineral oil | 20 |
| Peruvian chicle | 10 |

The rubber employed should preferably be a good quality of rubber and not a resinous rubbery mass such as pontianak or jelutong, which would, if used in the composition, be subject to oxidation, spoiling the physical properties of the mass in a relatively short time.

It will be understood that a small amount of fillers or pigments can be used to give a more pleasing color. Also dyes can be incorporated for this purpose.

After milling the rubber, the other materials can be incorporated with the rubber in a suitable kneading machine, preferably at steam heat, or they could (in part at least) be incorporated on the milling rolls, say during the latter part of the roll-milling of the rubber.

In the annexed drawing, I have shown a vertical section of a portion of a doll's head, carrying the plastic composition and the rubber skin. It will be understood that in practice the rubber skin is generally made very thin. It is also understood that the layer of permanently plastic composition to be used may be thin or thick as desired.

The present invention is not in any sense restricted to the relative thicknesses illustrated in said drawing.

I claim:—

1. A permanently plastic composition suitable for plastic doll faces and the like, comprising roll-milled rubber which has been broken down to a considerable degree, a resin of high stability, an oil which is non-volatile at room temperatures and of high chemical stability, and a natural chicle, all blended together to a substantially homogeneous mass.

2. A permanently plastic composition suitable for plastic doll parts and the like, comprising a blend of the following:—

|  | Parts |
| --- | --- |
| Broken down rubber | 35 |
| Chemically stable resin | 35 |
| Non-volatile mineral oil | 10 to 40 |
| Chicle | 20 to 40 |

3. A plastic composition which comprises milled rubber, coumarone resin of high melting point, purified viscous mineral oil of high boiling point, and chicle, such materials being well blended together, such composition not altering greatly in consistency by temperature changes between 70 and 100° F., being stable in the air, and retaining its physical properties as to plasticity for a long period, and being non-injurious to a rubber sheet placed in contact therewith.

4. A doll the face of which carries, beneath a thin rubber sheet, a permanently plastic composition suitable for plastic doll faces and the like, comprising roll-milled rubber which has been broken down to a considerable degree, a resin of high stability, an oil which is non-volatile at room temperatures, of high chemical stability, and a natural chicle, all blended together to a substantially homogeneous mass.

5. A doll head, the face portion of which carries a permanently plastic composition suitable for plastic doll parts and the like, comprising a blend of the following:—

|  | Parts |
| --- | --- |
| Broken down rubber | 35 |
| Chemically stable resin | 35 |
| High boiling point lubricating mineral oil | 10 to 40 |
| Chicle | 20 to 40 |

6. A doll face, carrying a plastic composition which comprises milled rubber, coumarone resin of high melting point, purified viscous mineral oil, and chicle, such materials being well blended together, such composition not altering greatly in consistency by temperature changes between 70 and 100° F., being stable in the air, and retaining its physical properties as to plasticity for a long period and being non-injurious to a rubber sheet placed in contact therewith.

JOHN O. BARKER.